No. 822,681.  
PATENTED JUNE 5, 1906.  
R. A. MIDDLETON.  
CARBURETER FOR GASOLENE ENGINES.  
APPLICATION FILED MAY 2, 1905.
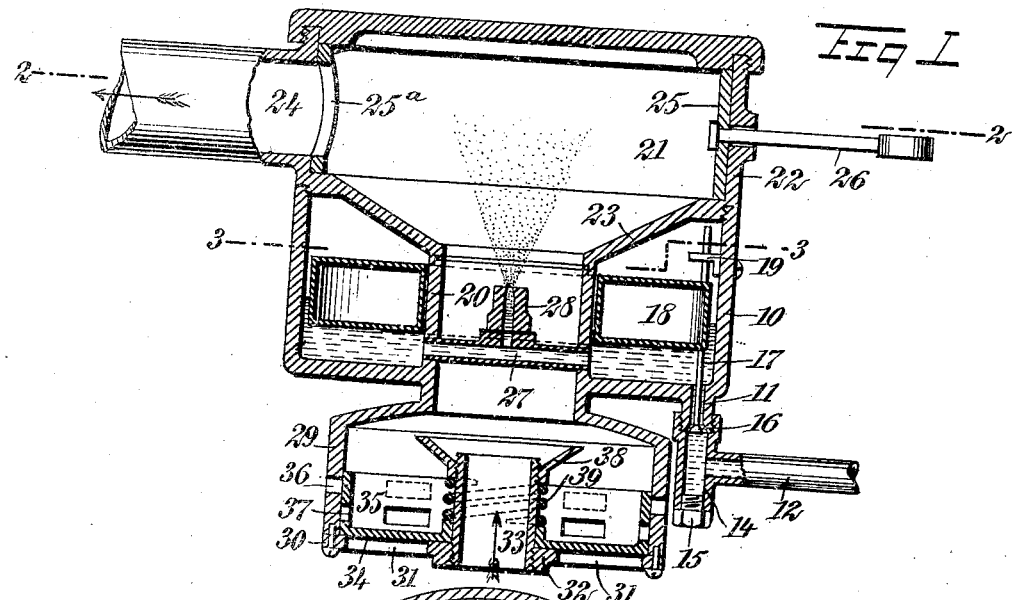
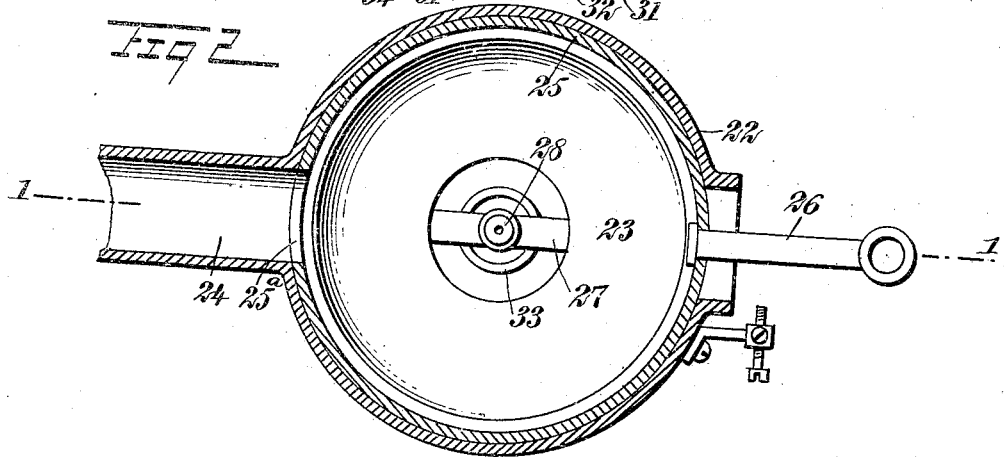
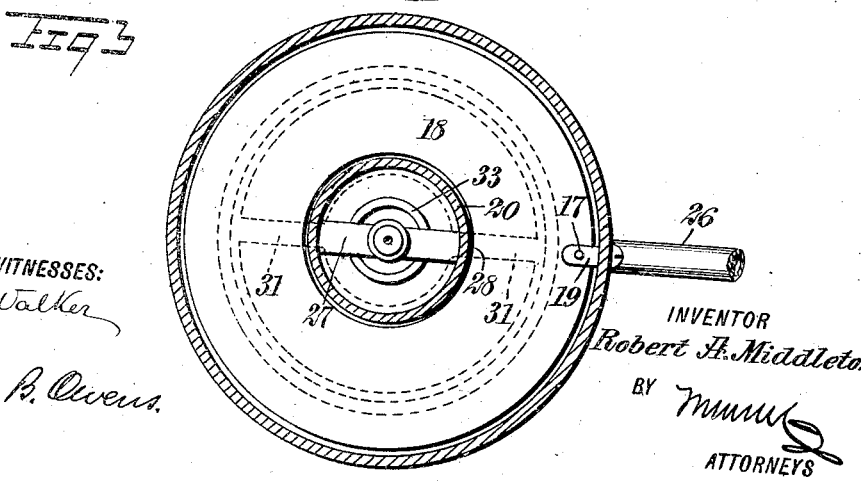
WITNESSES:  
H. Walker  
Isaac B. Owens.
INVENTOR  
Robert A. Middleton  
BY  
ATTORNEYS

UNITED STATES PATENT OFFICE.

ROBERT A. MIDDLETON, OF REXBURG, IDAHO.

CARBURETER FOR GASOLENE-ENGINES.

No. 822,681.     Specification of Letters Patent.     Patented June 5, 1906.

Application filed May 2, 1906. Serial No. 268,447.

*To all whom it may concern:*

Be it known that I, ROBERT A. MIDDLETON, a citizen of the United States, and a resident of Rexburg, in the county of Fremont and State of Idaho, have invented a new and Improved Carbureter for Gasolene-Engines, of which the following is a full, clear, and exact description.

The carbureter is designed especially for use in connection with internal-combustion engines, but may be used for other purposes, as will suggest themselves to persons skilled in the art.

The essential object of my invention is to provide improved devices for furnishing an auxiliary air-supply, so that when the engine runs at excessive speeds an increased quantity of air will be permitted to pass through the carbureter, thus maintaining the correct proportions of air and fuel. I attain this object by certain novel features of construction and organization, which will be fully set forth hereinafter, and particularly pointed out in the claims.

Reference is to be had to the accompanying drawings, which illustrate the preferred embodiment of my invention, in which drawings like characters of reference indicate like parts in the several views, and in which—

Figure 1 is a vertical section of the carbureter on the line 1 1 of Fig. 2. Fig. 2 is a sectional plan on the line 2 2 of Fig. 1, and Fig. 3 is a sectional plan on the line 3 3 of Fig. 1.

The carbureter is formed with walls 10, constituting a float-chamber, to which the supply of gasolene or other volatile oil passes by way of a duct 11. This duct communicates with the oil-supply pipe 12.

14 indicates a sediment-pocket, and 15 a plug therefor. This pocket is located directly below the duct 11, so as to catch any sediment that may pass from the pipe 12. The duct 11 is commanded by a valve 16, which may be of any desired sort. The valve is connected by a stem 17 with a float 18. The stem 17 passes above the float and loosely through a guide 19, carried within the float-chamber, as shown best in Fig. 1. The float 18 is circular or annular in form, the float having a central opening for the purpose which will hereinafter appear. Said float is constructed, preferably, of spun copper, although it may be of other material, as will be apparent. Passing centrally through the float-chamber and through the opening in the float are walls 20, forming an air-passage which opens into the vaporizer or mixing chamber 21, above the air-passage. Said chamber 21 is formed by walls 22, which in the preferred embodiment of my invention are removably connected with the walls 10 and are provided with a frusto-conical part 23, forming the bottom of the vaporizer-chamber 21, the walls 23 connecting with the walls of the passage 20, as shown in Fig. 1.

24 indicates the communication with the inlet-valve of the engine, and 25 an annular throttle-valve which is fitted to slide within the walls 22, so that its opening 25$^a$ may be placed in or out of registry with the pipe 24.

26 indicates an arm connected to the throttle-valve to permit operating the same. This arm may be operated by the governor of the engine or manually, as may be desired.

Extending across the air-passage 20 is a tube 27, which is in communication with the interior of the float-chamber 10, and 28 indicates a spray-nozzle communicating with the tube 27. The float 18, controlling the valve 16, maintains the volatile oil in the chamber 10, so that said oil lies in the nozzle 28 at the proper height. At the lower end of the passage 20 is located a valve-chamber 29. Fastened to the lower edge of this chamber 29 is a ring 30. This ring is formed with spider-arms 31, which support a collar 32. The collar in turn supports a tube 33, forming an air-inlet to the passage 20. Movable freely on the tube 33 is a disk 34. This disk is formed with an annular flange 35, which fits snugly against the inner walls of the chamber 29. The chamber 29 has air-inlet openings 36 formed therein, and the flanges 25 have openings 37, adapted to register with the openings 36 as the valve-disk 34 is raised above the position shown in Fig. 1. Attached to the upper end of the tube 33 is a frusto-conical spreader 38, and between this spreader and the valve-disk 34 a spring 39 bears, which spring tends yieldingly to seat the valve-disk, as is shown in Fig. 1.

In the operation of the invention upon starting the engine as the engine operates normally or at low pressure the suction-stroke of the piston draws a quantity of air through the pipe 33 and passage 20, and the suction in said passage 20 draws a quantity of gasolene from the nozzle 28, which gasolene mingles with the air and forms therewith a combustible mixture which passes into the cylinder of the engine through the pipe 24. During this time—i. e., the slow or normal operation of the engine—the disk valve 34 keeps its seat, and the entire air-supply is drawn through the tube 33. Upon the increase of the speed of the engine the suction of the passage 20 becomes greater, and this will lift the disk 34 against the spring 39 to a degree proportionate to the increased suction in the passage 20, and the openings 37 will then register with the openings 36 and the auxiliary or extra air-supply which is furnished to the carbureter, thus compensating for the increased amount of gasolene drawn from the nozzle 28 by the increased suction and maintaining the correct proportions of air and fuel in the combustible mixture. The greater the speed of the engine, and consequently the greater the suction exerted in the passage 20, the farther will be the movement of the valve-disk 34, thereby bringing the openings 36 and 37 into more or less complete registry and supplying an extra volume of air directly proportionate to the extra amount of gasolene drawn from the nozzle 28. The element 38, in addition to holding the spring 39 in place and spreading or deflecting the current of auxiliary or additional air entering the carbureter, also serves as a cup, collecting such gasolene as may drop from the nozzle 28, preventing the waste of this gasolene. The supply of mixture passing to the engine may be throttled at will by the valve 25, which is arranged to turn freely in the vaporizer-chamber 21 and may be actuated manually, by governor, or by both, as desired.

Various changes in the form, proportions, and minor details of my invention may be resorted to at will without departing from the spirit and scope thereof. Hence I consider myself entitled to all such variations as may lie within the terms of my claims.

Having thus described the preferred form of my invention, what I claim as new, and desire to secure by Letters Patent, is—

1. A carbureter having a liquid-fuel chamber with an air-passage extending through it, a carbureter-chamber above and communicating with the air-passage, a valve-chamber below and communicating with the air-passage, a main air-supply tube extending into the valve-chamber, an auxiliary air-supply valve sliding in the valve-chamber around the main air-supply tube, a spring encircling the main air-supply tube, and a frusto-conical member mounted on the air-supply tube and engaged by the spring, for the purpose specified.

2. A carbureter having a liquid-fuel chamber with an air-passage extending through it, means for conducting the liquid fuel from said chamber into the air-passage, said passage communicating at one end with the mixture-outlet from the carbureter, a valve-chamber communicating with the other end of the passage and having a main air-supply opening therein, and an auxiliary air-supply opening, and a valve commanding the auxiliary air-supply opening and controlled by the suction exerted in the carbureter.

3. A carbureter having a liquid-fuel chamber with an air-passage through it, means for conducting liquid fuel from said chamber into said passage, one end of the passage being adapted to communicate with the mixture-outlet from the carbureter, a valve-chamber at the other or receiving end of the passage, said chamber having a centrally-located main air-supply opening and an auxiliary air-supply opening in its side, and a valve controlled by the suction exerted through the carbureter, said valve commanding said auxiliary air-opening and surrounding the centrally-located main air-supply opening.

4. A carbureter having a liquid-fuel chamber with an air-passage extending through it, means for conveying the liquid fuel from said chamber into said passage, one end of the passage leading to the mixture-outlet from the carbureter, a valve-chamber communicating with the other or receiving end of the passage, said chamber having a centrally-located open tube forming a main air-supply, and an auxiliary air-supply port in the walls of the chamber outward from said tube, and an auxiliary air-supply valve commanding said port, the valves surrounding said tube of the valve-chamber and being actuated by the suction exerted through the carbureter.

5. A carbureter having a liquid-fuel chamber with an air-passage extending through it, means for introducing the liquid fuel from said chamber into said passage, the passage communicating at one end with the mixture-outlet from the carbureter, a valve-chamber communicating with the other or receiving end of the carbureter, said valve-chamber having a centrally-located open tube forming the main air-supply, and a valve-chamber having an opening in its bottom, and an auxiliary air-supply port in its side, and an annular valve commanding said port, the valve surrounding the tube of the valve-chamber and covering the opening in the bottom of said chamber whereby one side of the valve is exposed to atmospheric pressure and the other side to the suction exerted through the carbureter.

In testimony whereof I have signed my name to this specification in the presence of two subscribing witnesses.

ROBERT A. MIDDLETON.

Witnesses:
  A. M. CARBUN,
  R. A. MIDDLETON.